B. F. Baker,
Harness Yoke,
N° 63,357.    Patented Apr. 2, 1867.

Sheet 1 - 2 Sheets.

Witnesses:
Edw. Schafer
Walter Hinchman

Inventor:
B. F. Baker

B. F. Baker,
Harness Yoke,
No 63,357. Patented Apr. 2, 1867.
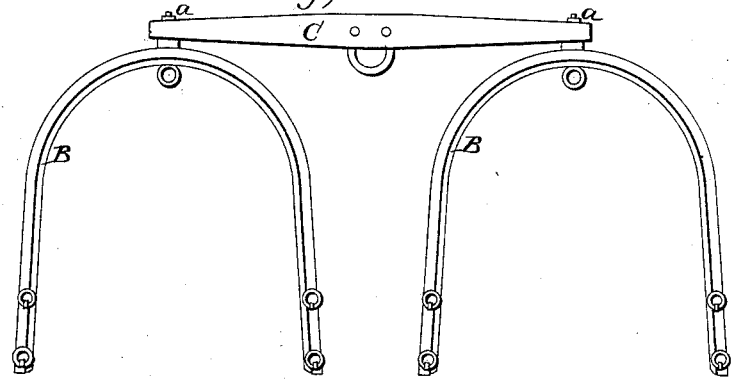
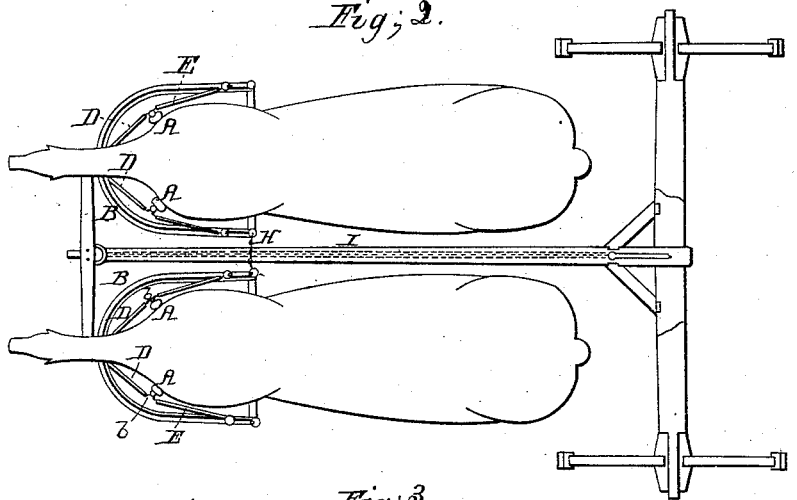
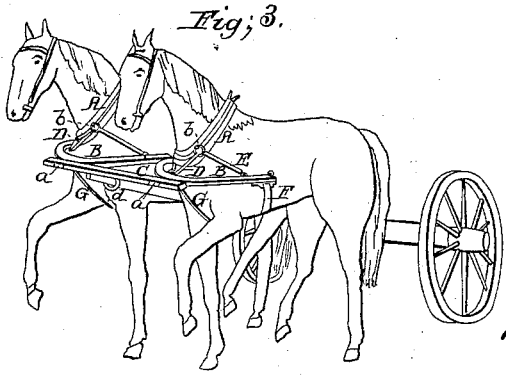
Witnesses:
Edw Schafer
Walter Hinchman
Inventor:
B. F. Baker

United States Patent Office.

B. F. BAKER, OF MILTON, NEW YORK.

Letters Patent No. 63,357, dated April 2, 1867.

---

IMPROVED HORSE YOKE HARNESS.

---

The Schedule referred to in these Letters Patent and making part of the same.

---

TO ALL WHOM IT MAY CONCERN:

Be it known that I, B. F. BAKER, of Milton, Saratoga county, State of New York, have invented a new and useful improvement in Horse Yoke Harness; and I hereby declare that the following is a full, clear, and exact description thereof, reference being had to the accompanying drawings, making part of this specification, in which—

Figure 1:
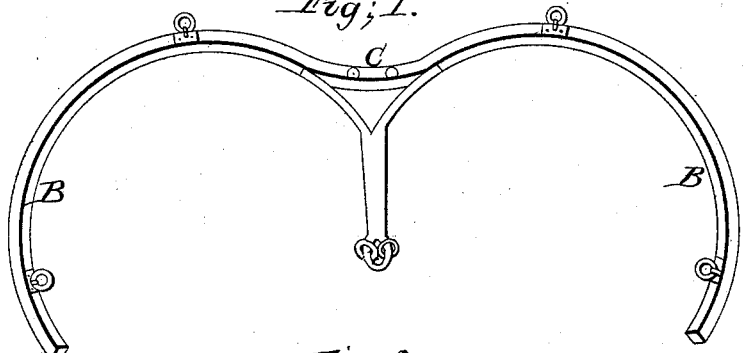

Figure 1, sheet 1, shows the yoke and evener detached.

Figure 2:
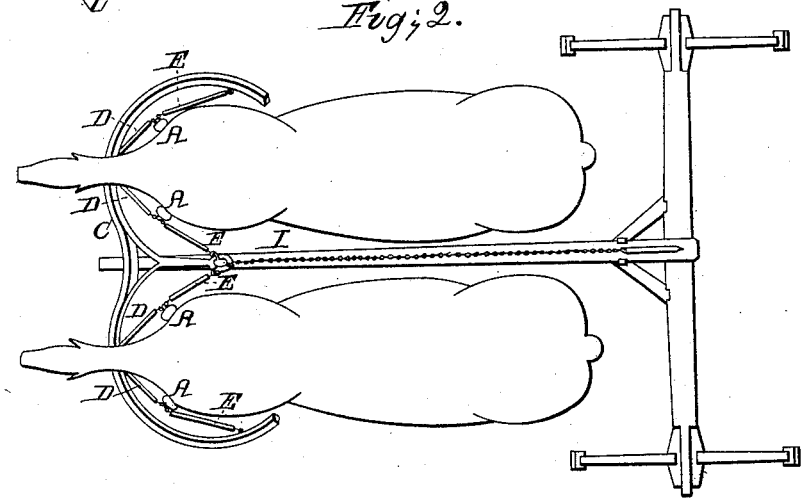
Figure 3:
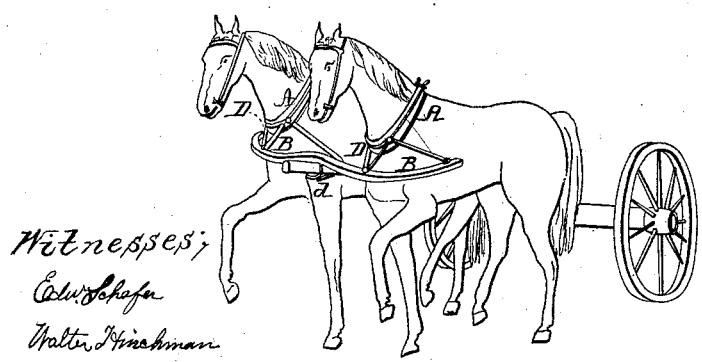

Figure 2, a horizontal section of the horse yoke harness applied to a wheeled vehicle and to two horses; and Figure 3, a perspective view of the same.

Figures 1, 2, 3, sheet 2, show a modification of the invention.

Similar letters of reference in the several figures indicate corresponding parts.

The nature of my invention consists in so constructing a horse yoke harness that the bows of the yoke may be employed in a horizontal or nearly a horizontal position, and at the same time be supported upon the hames or collar so as to be kept at all times from contact with the horse's breast, and still transfer the weight of the load to be drawn, or resistance to be overcome, evenly upon the shoulders or that part of the horse which is most capable of sustaining the same; the arrangement also being such that but a single draught evener is required, and also a single draught chain, or, what is the equivalent of a draught evener, two bows united as one and playing about a common centre of motion.

To enable others skilled in the art to understand my invention I will proceed to describe the same with reference to the drawings.

A A, sheet 1, fig. 3, represent the collars and hames of a pair of horses. B B, a pair of bows connected by swivels or pivots to the ends of a centrally pivoted draught evener, C, the support of the latter of which being in this instance the tongue of a wagon. D D represent short tugs or hold-back straps, connected to the rings of hames or collars and to an eye on the pivots $a$ $a$ of the bows, as represented. These tugs or straps have hooks at their ends, in order that the connection of them to the hame rings $b$ may be readily effected. E E back tugs, furnished with hooks at each end, and connected by one end to the extremities of the bows, and at the other end to the hame rings, as represented. F F are broad girths or belly bands, furnished with a hook at each extremity, and connected by means of these hooks to the two extremities of each bow, as represented. G G are martingales, furnished respectively with a hook, and connected to the eye of the pivots of the bows, as represented. H is a strap or chain, furnished with a hook at each end, and connected to eyes on the inner side of the two bows, so as to prevent the horses spreading apart or getting away from their work. I is a draught chain, furnished with a hook at its forward end, and connected to an eye of the draught evener, as represented. In order to give elasticity of motion between the bow and the evener, a rubber cushion is interposed between each of the bows at the point where the pivot bolts pass through the bows and evener, as represented. The plan of construction described I regard as best adapted to farm use, for the reason that horses of different sizes may be used in it; also horses of different spirits, one fast and one slow. It may likewise be used in side-hill ploughing when one animal is lower than the other, the independent bows being admirably adapted for these varying circumstances. And, further, by detaching one of the bows from the neck yoke evener and adjusting traces to it the farmer has a harness for a single rig or horse ploughing out corn, cultivating in drilled crops, and other similar work; or the bows may be used singly by having traces hook into one of the eyes at the extremities of one bow. In connection with this arrangement breeching straps may be used, if deemed necessary, the hooks of such straps hooking into the eyes on the extremities of the bows. It should be understood that all of the points of connection between the respective parts are free joints, such as allow a ready accommodation of one another to the movements of the horses or vehicle or agricultural implement to which the horses are attached. In the arrangement described the draught evener is connected to the tongue or beam by means of an eye, $d$, through which the tongue slips, as represented. This eye, $d$, may, if desirable, be suspended from the draught evener by means of two short chains, and thus be more readily applicable to vehicles and implements having long tongues or beams. Instead of making the tugs in two parts, they may be made rigid, and fitted to the rings of the hames and to the eye of the pivots of the bows in such a manner as to perform the function, to a certain extent, of the tugs represented. In such case the rigid tugs will be free to play in their supports, but not to slide.

In figs. 1, 2, and 3, sheet 2, I have shown a form of construction possessing some advantages over that shown in figs. 1, 2, and 3, sheet 1, but generally less desirable. Being made in one piece, it does not adapt itself so well to horses of different sizes and gait, nor to uneven ground; but for well-matched teams on the road or on level land it is all that is required. It obviates the necessity of the broad belly band, which is used in the mode of construction, shown on sheet 1, to prevent the tipping upward of the ends of the bow. The construction of the yoke, shown on sheet 2, obviates this tendency to tip by reason of the introduction of the elongated clevis in the centre of the yoke. The mode of applying this modified combined evener and yoke to the tongue or beam is the same as that adopted in the construction shown on sheet 1; but the mode of applying the inner tugs is slightly different therefrom, said tugs being attached to the eye of the clevis instead of to the inner extremities of the bows, as on sheet 1. The draught chain, however, is attached in substantially the same manner.

The operation of the whole apparatus in the drawings is as follows: When the bodies of the horses are advanced, the tension of the short traces or tugs communicates a forward motion to the yoke, and the strain is thus concentrated on the draught chain and thence upon the load. In holding back the neck of the yoke acts precisely as in the old style. It will thus be seen that the pressure is brought evenly on the shoulders of the horses, and that each has sufficient independence of motion to enable him to work with ease on even or rough ground or on the hill-side. In passing over very rough ground the pole is prevented from thumping the side of the horses not only by the hold-back straps or back tugs, but also by the tension of the short tugs. It is also true that the angle at which the tugs bear off from the collars is such as to bring the draught more immediately in front of the shoulders, the spreading of the shorter tugs giving greater ease to the animals and obviating the tendency to chafe and gall them, which occurs when traces are used. By the means herein described I am enabled to bring the team back as near their work as desirable. Various contrivances have been resorted to to prevent the projecting end of the whiffle-trees used in rear of horses from breaking or otherwise damaging young fruit trees when it was necessary to cultivate among them. None of these devices, so far as I am aware, have been successful; and in such instances where attempts have been made to use bows and eveners in place of whiffle-trees, the construction and arrangement thereof have been so cumbersome that success has not attended their use. But with my improvements I believe all the difficulties heretofore experienced will be obviated.

Having described my invention, what I claim as new, and desire to secure by Letters Patent, is—

1. So constructing and applying a horse yoke harness that the pressure or draught is brought evenly upon the shoulders or breast of the horse or horses instead of upon the upper part of their necks, substantially as described and shown.

2. The suspension of the bow or bows in a nearly horizontal position from the hame or collar by the means substantially as described and for the purpose set forth.

3. The diagonal or oblique back straps or tugs with one of their ends attached to the hame or collar, and their other ends attached to the extremities of the bows, substantially as described.

4. The central draught chain and short tugs in combination with the bows and evener, applied substantially as described for the purpose set forth.

B. F. BAKER.

Witnesses:
R. T. CAMPBELL,
WALTER HINCHMAN.